United States Patent [19]

Yamazaki et al.

[11] 3,907,855

[45] Sept. 23, 1975

[54] PROCESS FOR PRODUCING ACTIVE ESTERS OF AMINO ACIDS

[75] Inventors: Noboru Yamazaki; Fukuji Higashi, both of Tokyo, Japan

[73] Assignee: Sumitomo Chemical Company, Limited, Osaka, Japan

[22] Filed: Dec. 10, 1973

[21] Appl. No.: 423,196

[30] Foreign Application Priority Data

Dec. 13, 1972  Japan.............................. 47-125415

[52] U.S. Cl........... 260/455 R; 260/112.5; 260/309; 260/326.14 T; 260/326.2; 260/399; 260/404; 260/465 D; 260/482 C; 260/482 B; 260/471 R; 260/468 J

[51] Int. Cl.².................................... C07C 153/09

[58] Field of Search............ 260/471 A, 455 R, 404, 260/399, 482 C, 482 B, 465 D

[56] References Cited

OTHER PUBLICATIONS

Fieser, L. F. et al. Advanced Organic Chemistry, (1961) pub. by Reinhold Pub. Corp. of New York pp. 1042–1044 cited.

*Primary Examiner*—Robert Gerstl
*Assistant Examiner*—L. A. Thaxton
*Attorney, Agent, or Firm*—Stevens, Davis, Miller & Mosher

[57] ABSTRACT

Active esters of amino acids having protected amino groups (hereinafter represented by "N-protected amino acids") are produced by reacting an N-protected amino acid with a compound having at least one hydroxyl or mercapto group in the presence of a phosphorous acid ester and a tertiary amine.

4 Claims, No Drawings

PROCESS FOR PRODUCING ACTIVE ESTERS OF AMINO ACIDS

This invention relates to a process for producing active esters of amino acids having protected amino groups (hereinafter represented by "N-protected amino acids"). More particularly, this invention relates to a process for producing active esters of N-protected amino acids by reacting an N-protected amino acid with a compound having at least one hydroxyl or mercapto group in the presence of a phosphorous acid ester and a tertiary amine.

Active esters of N-protected amino acids are useful for preparing acid amides under mild conditions and are important starting materials in the peptide synthesis.

Active esters of amino acids have been produced by various processes. For example, according to a mixed anhydride method, ethyl chlorocarbonate is reacted with an amino acid having a protected amino group. But the yield of this method is no so good because of insufficient selective alcoholysis. Further an acid chloride method and an oxidation-reduction method are proposed, but these methods are not suitable for commercial scale production since it is very difficult to synthesize starting materials and the use of expensive special reagents is necessary.

It is an object of this invention to provide a process of producing active esters of amino acids using easily available starting materials. It is another object of this invention to provide a process for producing active esters of amino acids in excellent yield under mild conditions. Further objects and advantages of this invention will be apparent to one skilled in the art from the accompanying disclosure and discussion.

In accordance with the present invention, active esters of N-protected amino acids are produced by reacting an amino acid having a protected amino group of the formula, $$H_2N - R^1 - COOH \qquad (I)$$

wherein $R^1$ is a straight- or branched-chain or cycloaliphatic hydrocarbon radical, an aromatic hydrocarbon radical which may have at least one substituent, such as an alkyl having 1 - 30 carbon atoms, phenyl, benzyl or alkylcarbamoyl group, or a radical in which two or more radicals selected from the group consisting of the above-mentioned aliphatic or aromatic hydrocarbon radicals are bonded through —CONH—group, with a compound having at least one hydroxyl or mercapto group of the formula, $$R^2OH \text{ or } R^2SH \qquad (II)$$

wherein $R^2$ is an aryl radical having at least one substituent, such as nitro, N,N-dimethylamino and cyano groups, in the presence of a phosphorous acid ester of the formula,

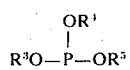

(III)

wherein $R^3$ is a hydrogen atom or an alkyl, aralkyl, or aryl group which may have at least one substituent $R^4$ and $R^5$ are independently an alkyl, aralkyl, or aryl group which may have at least one substituent, and a tertiary amine under extremely mild conditions.

As the N-protected amino acid of the formula (I), that having normal or branched alkylene of one or more carbon atoms, preferably 1 – 12 carbon atoms, cycloalkylene of three or more carbon atoms, preferably 3 – 8 carbon atoms, phenylene,

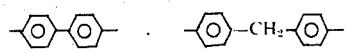

or a radical in which two or more radicals selected from the group consisting of the above-mentioned aliphatic and aromatic hydrocarbon radicals are bonded through —CONH— as $R^1$ is preferable.

Examples of these amino acids are glycine, glycyl-glycine, sarcosine, dimethyl-glycine, alanine, phenylalanine, α-aminobutyric acid, α-aminoisobutyric acid, valine, leucine, isoleucine, norleucine, glutamine, α-aminoenanthic acid, α-aminocaprylic acid, α-aminopelargonic acid, α-aminocapric acid, α-aminoundecanoic acid, α-aminolauric acid, α-aminomyristic acid, α-aminostearic acid, α-aminoarachic acid, α-aminocerotic acid, α-aminomelissic acid, β-alanine, β-aminobutyric acid, β-aminoisobutyric acid, β-aminovaleric acid, γ-aminobutyric acid, γ-aminovaleric acid, δ-aminovaleric acid, ξ-aminocaproic acid, ω-aminoenanthic acid, ω-aminocaprylic acid, ω-aminopelargonic acid, ω-aminocapric acid, ω-aminoundecanoic acid, ω-aminotridecanoic acid, 4-aminocyclohexanecarboxylic acid, p-aminobenzoic acid, p-(4-aminophenyl)benzoic acid, p-(4-aminobenzyl)benzoic acid and the like.

The amino group of an amino acid as mentioned above can be protected by a conventional method. For example, an acylation method using such a group as formyl, trifluoroacetyl, benzyloxycarbonyl, tertiary-butoxycarbonyl, tertiary-amyloxycarbonyl or the like can be employed. Further, the elimination of a protective group can be proceeded by a conventional method. For example, when a benzyloxycarbonyl group is the protective group for an amino group, it can be eliminated by a catalytic reducing process using palladium catalyst in a solvent such as ethanol, dioxane, dioxane-water, dimethylformamide or the like. In the case of tertiary-amyloxycarbonyl group, it can be eliminated by treating with trifluoroacetic acid or the like.

As the compound having at least one hydroxyl or mercapto group, a phenol derivative such as o-, m- or p-nitrophenol, 2,4-dinitrophenol, thiophenol, α- or β-naphthol, p-N,N-dimethylaminophenol, p-cyanophenol, o- or p-methoxycarbonylphenol can preferably be used.

As the phosphorous acid ester of the formula (III), the one in which $R^3$ is hydrogen atom and $R^4$ and $R^5$ are the same such as dimethyl phosphite, diethyl phosphite, diisopropyl phosphite, di-normalbutyl phosphite and diphenyl phosphite, or the one in which $R^3$, $R^4$ and $R^5$ are the same such as triethyl phosphite, triisopropyl phosphite, tributyl phosphite and triphenyl phosphite can be used. Above all, diaryl phosphite such as diphenyl phosphite and triaryl phosphite such as triphenyl phosphite are most preferable.

As the tertiary amines, pyridine, 2-methyl pyridine, 3-methyl pyridine, 4-methyl pyridine, 2,6-dimethyl pyridine, imidazole and the like are preferable. Above all, pyridine is most preferable.

A tertiary amine can act as an acid acceptor and as a catalyst. When a tertiary amine is a liquid, it can be used as a solvent and the use of other solvent is unnecessary, but if desired, other inert solvent such as acetonitrile or dimethylformamide may be used for the reaction.

The reaction can be preferably carried out at a temperature of from 20° to 200°C, more preferably from room temperature of 100°C.

An N-protected amino acid and a compound having at least one hydroxyl or mercapto group are generally used in a molar ratio of 1 : 1. A phosphorous acid ester of the formula (III) is used in 1 – 10 moles, more preferably 1 – 5 moles per mole of one of the starting materials and at least equimolar tertiary amine is used per mole of one of the starting materials.

The invention is illustrated more particularly by way of the following examples but, as will be more apparent, is not limited to the details thereof.

EXAMPLE 1

Diphenyl phosphite (4.50 g, 18.8 mmole), 2.6 g (12.5 mmole) of glycine, the amino group of which is protected by a benzyloxycarbonyl group (hereinafter referred to as Z—Gly.OH wherein Z is a benzyloxycarbonyl group and Gly is the residue of glycine), 1.75 g (12.5 mmole) of p-nitrophenol and 30 ml of pyridine were placed in a 100 -ml flask and the reaction was carried out at 40°C for 12 hours. After the reaction pyridine was removed by distillation under reduced pressure and the residue was extracted with ethyl acetate. The ethyl acetate layer was washed with 2N HCl, saturated $NaHCO_3$ and water in this order and dried over anhydrous $Na_2SO_4$. The ethyl acetate layer was distilled under reduced pressure and the residue was treated with petroleum ether-ether to give 3.2 g of p-nitrophenyl N-benzyloxycarbonyl-glycinate (Z—Gly.O—$C_6H_4$—$NO_2$(P)) in 77% yield.

EXAMPLE 2

Using a procedure similar to that described in Example 1, from N-benzyloxycarbonyl phenylalanylglycine (hereinafter referred to as Z—Phe-Gly.OH wherein Phe is the residue of phenylalanine) and p-nitrophenol, p-nitrophenyl N-benzyloxycarbonyl-phenylalanylglycinate (Z—Phe—Gly.O—$C_6H_4$—$NO_2$(P)) was obtained in 73% yield.

EXAMPLE 3

Using a procedure similar to that described in Example 1, from N-benzyloxycarbonyl glutamine (hereinafter referred to as Z—Glu($NH_2$)) and p-nitrophenol, p-nitrophenyl N-benzyloxycarbonyl-glutaminate (Z—Glu($NH_2$).O—$C_6H_4$—$NO_2$(P)) was obtained in 45% yield.

EXAMPLE 4

Using a procedure similar to that described in Example 1, p-methoxycarbonylphenyl N-benzyloxycarbonyl-glycinate (Z—Gly.O—$C_6H_4$—$COOCH_3$(P)) was obtained in 69% yield from Z—Gly.OH and methyl p-oxybenzoate.

EXAMPLE 5

Using a procedure similar to that described in Example 1, phenylthio N-benzyloxycarbonyl-glycinate (Z—Gly.S—$C_6H_4$) was obtained in 89% yield from Z—Gly.OH and thiophenol.

EXAMPLE 6

A procedure similar to that described in Example 1 was carried out but 4.50 g (18.8 mmole) of diphenyl phosphite was replaced by 3.9 g (12.5 mmole) of triphenyl phosphite. Z—Gly.O—$C_6H_4$—$NO_2$(P) was obtained in 83% yield.

EXAMPLE 7

A procedure similar to that described in Example 4 was carried out but 4.50 g (18.8 mmole) of diphenyl phosphite was replaced by 1.95 g (6.25 mmole) of triphenyl phosphite. Z—Gly.O—$C_6H_4$—$COOCH_3$(P) was obtained in 70% yield.

EXAMPLE 8

Using a procedure similar to that described in Example 7, from N-benzyloxycarbonyl phenylalanine (hereinafter referred to as Z—Phe.OH) and p-nitrophenol, p-nitrophenyl N-benzyloxycarbonyl phenylalaninate (Z—Phe.O—$C_6H_4$—$NO_2$(P)) was obtained in 73% yield.

EXAMPLE 9

A procedure similar to that described in Example 3 was carried out but 4.50 g (18.8 mmole) of diphenyl phosphite was replaced by 1.95 g (6.25 mmole) of triphenyl phosphite. Z—Glu($NH_2$).O—$C_6H_4$—$NO_2$(P) was obtained in 48% yield.

EXAMPLE 10

A procedure similar to that described in Example 5 was carried out but 4.50 g (18.8 mmole) of diphenyl phosphite was replaced by 1.95 g (6.25 mmole) of triphenyl phosphite. Z—Gly.S—$C_6H_5$ was obtained in 64% yield.

What is claimed is:

1. A process for producing an active ester of amino acid having one or more protected amino groups which comprises reacting an amino acid having one or more protected amino groups with a compound having at least one hydroxyl or mercapto group at a temperature of 20° to 200°C. in the presence of 1–10 moles of phosphorous acid ester and at least equimolar tertiary amine per mole of one of the starting materials.

2. A process according to claim 1, wherein the compound having at least one hydroxyl or mercapto group is o-, m- or p-nitrophenol, thiophenol, 2,4-dinitrophenol, α- or β-naphthol, p-N,N-dimethylaminophenol, p-cyanophenol or o- or p-methoxycarbonylphenol.

3. A process according to claim 1, wherein the phosphorous acid ester is dimethyl phosphite, diethyl phosphite, diisopropyl phosphite, di-normal-butyl phosphite, diphenyl phosphite, triethyl phosphite, triisopropyl phosphite, tributyl phosphite or triphenyl phosphite.

4. A process according to claim 1, wherein the tertiary amine is pyridine, 2-methyl pyridine, 3-methyl pyridine, 4-methyl pyridine, 2,6-dimethyl pyridine or imidazole.

* * * * *